United States Patent
Hatano (10) Patent No.: US 8,497,959 B2
(45) Date of Patent: Jul. 30, 2013

(54) OPTICAL FILM AND LIQUID CRYSTAL DISPLAY

(75) Inventor: Taku Hatano, Tokyo (JP)

(73) Assignee: Zeon Corporation, Tokyo (JP)

( * ) Notice: Subject to any disclaimer, the term of this patent is extended or adjusted under 35 U.S.C. 154(b) by 309 days.

(21) Appl. No.: 13/121,217

(22) PCT Filed: Sep. 18, 2009

(86) PCT No.: PCT/JP2009/066443
§ 371 (c)(1),
(2), (4) Date: Mar. 28, 2011

(87) PCT Pub. No.: WO2010/035720
PCT Pub. Date: Apr. 1, 2010

(65) Prior Publication Data
US 2011/0176093 A1 Jul. 21, 2011

(30) Foreign Application Priority Data
Sep. 29, 2008 (JP) ................................. 2008-250161

(51) Int. Cl.
*G02F 1/1335* (2006.01)
(52) U.S. Cl.
USPC .............................. 349/120; 349/117; 349/96
(58) Field of Classification Search
None
See application file for complete search history.

(56) References Cited

U.S. PATENT DOCUMENTS

| | | | | |
|---|---|---|---|---|
| 2008/0284957 | A1* | 11/2008 | Haruta et al. | 349/117 |
| 2009/0290103 | A1* | 11/2009 | Itou | 349/96 |

FOREIGN PATENT DOCUMENTS

| | | |
|---|---|---|
| JP | 3-24502 A | 2/1991 |
| JP | 3-141303 A | 6/1991 |
| JP | 5-157911 A | 6/1993 |
| JP | 2001-42121 A | 2/2001 |
| JP | 2001-194527 A | 7/2001 |
| JP | 2002-71956 A | 3/2002 |
| JP | 2002-107542 A | 4/2002 |
| JP | 2003-90912 A | 3/2003 |
| JP | 2005-241965 A | 9/2005 |
| JP | 2008-77004 A | 4/2008 |

OTHER PUBLICATIONS

International Search Report dated Oct. 27, 2009 in International Application No. PCT/JP2009/066443.

* cited by examiner

*Primary Examiner* — Wen-Ying P Chen
(74) *Attorney, Agent, or Firm* — Birch, Stewart, Kolasch & Birch, LLP (57) ABSTRACT

An optical film includes: a layer A formed of a resin composition P1 containing a resin x1 having a positive intrinsic birefringence value and a resin y1 having a negative intrinsic birefringence value; and a layer B formed of a resin composition P2 containing a resin x2 having a positive intrinsic birefringence value and a resin y2 having a negative intrinsic birefringence value. In the optical film, retardations $R_{450}$, $R_{550}$, and $R_{650}$ at an incident angle of 0° satisfy the relationship of $R_{450} < R_{550} < R_{650}$, and retardation Re at an incident angle of 0° and retardation $R_{40}$ at an incident angle of 40°, satisfy the relationship of $0.92 \leq R_{40}/Re \leq 1.08$. Also provided is a liquid crystal display device including the optical film.

8 Claims, 2 Drawing Sheets

OPTICAL FILM AND LIQUID CRYSTAL DISPLAY

TECHNICAL FIELD

The present invention relates to an optical film and to a liquid crystal display device. More particularly, the invention relates to an optical film suitable as a phase difference film and to a liquid crystal display device including the optical film.

BACKGROUND ART

As an example of optical films such as phase difference films for use in display devices such as liquid crystal display devices, there is known a film manufactured by stretching isotropic raw material films to give orientation to molecules.

It is desirable that such optical films do not cause much color tone change of display devices even when the observation angle is shifted, and that such optical films can uniformly provide effects, such as phase difference compensation effect, over a wide wavelength range.

As examples of the known phase difference film that can uniformly provide the effects such as phase difference compensation effect over a wide wavelength range, there are known films obtained by stretching a composition containing a plurality of resins (Japanese Patent Application Laid-Open Nos. 2001-194527 and 2001-42121). However, with these films, color tone changes due to observation angle shift cannot be reduced.

For reducing color tone changes due to observation angle shift, it is desired that retardation Re at an incident angle of 0° (in the direction normal to the film) is brought as close as possible to retardation $R_{40}$ at an incident angle of 40° (an inclination angle of 40° with respect to the direction normal to the film). In order to obtain such an optical film, it is desired that, e.g., the refractive indices nx and ny in the directions of in-plane principal axes and the refractive index nz in the thickness direction satisfy the relationship of nx>nz>ny.

However, most resins have positive intrinsic birefringence values, stretching of which results in smaller nz than nx and ny. Resins having negative intrinsic birefringence values such as polystyrene are unsuitable for optical films in terms of inappropriate hardness and flexibility of the stretched film made thereof. Therefore, it is difficult to obtain a useful stretched film that satisfies the relationship of nx>nz>ny. As methods for solving this problem, there have known a method in which a plurality of species of films are laminated, and a method in which a stretched film is shrunk (Japanese Patent Application Laid-Open Nos. Hei 03-24502, Hei 03-141303, and Hei 05-157911). However, these methods are accompanied by difficulties in controlling the direction of lamination and shrinkage, which renders the manufacturing process complicated, and renders manufacture of a film having a large area difficult.

DISCLOSURE OF INVENTION

Problem to be Solved by the Invention

It is an object of the present invention to provide an optical film and a liquid crystal display device that can be easily manufactured at low cost, can have a large area, causes reduced color tone changes due to observation angle shift, and has uniformity in expressing effects, e.g. uniform phase difference compensation, over a wide wavelength range.

Means for Solving Problem

The present inventor has conducted studies to solve the aforementioned problem and found out that the problem can be solved by a stacked body including a plurality of species of layers each of which is made of a resin composition containing a plurality of species of resins each having specific intrinsic birefringence values. The invention has been completed based on this finding.

Accordingly, the present invention provides (1) to (8) below.

(1) An optical film, comprising:

a layer A formed of a resin composition P1 containing a resin x1 having a positive intrinsic birefringence value and a resin y1 having a negative intrinsic birefringence value; and a layer B formed of a resin composition P2 containing a resin x2 having a positive intrinsic birefringence value and a resin y2 having a negative intrinsic birefringence value, wherein:

retardation $R_{450}$ of light having a wavelength of 450 nm at an incident angle of 0°, retardation $R_{550}$ of light having a wavelength of 550 nm at an incident angle of 0°, and retardation $R_{650}$ of light having a wavelength of 650 nm at an incident angle of 0° satisfy a relationship of $R_{450} < R_{550} < R_{650}$, and retardation Re at an incident angle of 0° and retardation $R_{40}$ at an incident angle of 40° satisfy a relationship of $0.92 \leq R_{40}/Re \leq 1.08$.

(2) The aforementioned optical film wherein an intrinsic birefringence value of the resin composition P1 is positive, and an intrinsic birefringence value of the resin composition P2 is negative.

(3) The aforementioned optical film wherein the optical film is obtained by stretching more than once a pre-stretch film.

(4) The optical film according to (3), wherein the pre-stretch film has a layer PA formed of the resin composition P1 and a layer PB formed of the resin composition P2, and the pre-stretch film is a film which causes a phase delay when the pre-stretch film is uniaxially stretched in a direction of an X axis at temperature T1 and which also causes a phase advancement when the pre-stretch film is uniaxially stretched in the direction of the X axis at temperature T2 that is different from the temperature T1, said phase delay and said phase advancement being of a phase of linearly polarized light incident perpendicularly on a surface of the pre-stretch film having a vibration plane of an electric vector lying in an XZ plane relative to a phase of linearly polarized light incident perpendicularly on the surface of the pre-stretch film having a vibration plane of an electric vector lying in a YZ plane, where the X axis extends in one in-plane direction in the pre-stretch film, the Y axis extends in an in-plane direction orthogonal to the X axis in the pre-stretch film, and the Z axis extends in a direction of a thickness of the pre-stretch film.

(5) The optical film according to (4), wherein the stretching comprises:

stretching treatment (1) in which the pre-stretch film is uniaxially stretched in one stretching direction at one of the temperatures T1 and T2; and stretching treatment (2) in which the pre-stretch film that has been subjected to the stretching treatment (1) is uniaxially stretched in a direction orthogonal to the one stretching direction in the stretching treatment (1) at the other of the temperatures T1 and T2.

(6) The aforementioned optical film wherein a difference between a heat deflection temperature Ts(p1) of the resin composition P1 and a heat deflection temperature Ts(p2) of the resin composition P2 is 5° C. or more.

(7) The aforementioned optical film wherein optical film is a lengthy film.

(8) A liquid crystal display device, comprising the aforementioned optical film.

Effect of the Invention

The optical film of the present invention can be easily manufactured at low cost and have a large area. In addition thereto, the optical film can provide prominent advantages such as reduced color tone change due to observation angle shift, and uniform expression of effects, e.g. uniform phase difference compensation, over a wide wavelength range.

Particularly, when the optical film is obtained by subjecting a specific pre-stretch film to the stretching treatment (1) and the stretching treatment (2), an optical film having a desired refractive indices (nx>nz>ny) can be obtained with particularly high manufacturing efficiency by simple operations including biaxial stretching of a pre-stretch film having a plurality of layers in specific directions. Such operations do not include any complicated processes such as lamination of resin films that have been stretched at different stretching ratios in different stretching directions or shrinkage of a stretched resin. The resulting optical film having such refractive indices has not been easily obtainable in the prior art manufacture process, and has preferred characteristics as mentioned above.

The liquid crystal display device of the present invention has the optical film of the present invention. Therefore, this display device can be easily manufactured at low cost and can have a large area. In addition thereto, the liquid crystal display devise can provide prominent advantages such as reduced color tone change due to observation angle shift, and uniform display characteristics over a wide wavelength range.

BEST MODE FOR CARRYING OUT THE INVENTION (Optical Film)

The optical film of the present invention has a layer A formed of a resin composition P1 containing a resin x1 having a positive intrinsic birefringence value and a resin y1 having a negative intrinsic birefringence value; and a layer B formed of a resin composition P2 containing a resin x2 having a positive intrinsic birefringence value and a resin y2 having a negative intrinsic birefringence value.

Examples of the resins x1 and x2 having positive intrinsic birefringence values may include: olefin resins such as polyethylene and polypropylene; polyester resins such as polyethylene terephthalate and polybutylene terephthalate; polyarylene sulfide resins such as polyphenylene sulfide; polyvinyl alcohol resins; polycarbonate resins; polyarylate resins; cellulose ester resins; polyether sulfone resins; polysulfone resins; polyallyl sulfone resins; polyvinyl chloride resins; norbornene resins; rod-like liquid crystalline polymers; and polyarylene ether resins such as polyphenylene ether resins. One species thereof may be solely used, and two or more species thereof may also be used in combination. Of these, polycarbonate resins, norbornene resins, and polyphenylene ether resins are preferred in the present invention, from the viewpoint of phase difference-causing ability.

Examples of the resins y1 and y2 having negative intrinsic birefringence values may include: polystyrene-based resins such as homopolymers of styrene and styrene derivatives and copolymers thereof with other monomers; polyacrylonitrile resins; polymethyl methacrylate resins; and multi-component copolymers thereof. One species thereof may be solely used, and two or more species thereof may also be used in combination. Preferred examples of other monomers contained in the polystyrene-based resins may include acrylonitrile, maleic anhydride, methyl methacrylate, and butadiene. Of these, the polystyrene-based resins are preferred for the present invention because of their high phase difference-causing ability. Copolymers of styrene or styrene derivatives with maleic anhydride may also be used taking advantage of their high heat resistance. The stereoregularity of the polystyrene-based resins may be an atactic structure or a syndiotactic structure.

The optical film of the present invention satisfies the following requirement 1 and requirement 2.

(Requirement 1) Retardation $R_{450}$ of light having a wavelength of 450 nm at an incident angle of 0°, retardation $R_{550}$ of light having a wavelength of 550 nm at an incident angle of 0°, and retardation $R_{650}$ of light having a wavelength of 650 nm at an incident angle of 0° satisfy the relationship of $R_{450} < R_{550} < R_{650}$.

(Requirement 2) Retardation Re at an incident angle of 0° and retardation $R_{40}$ at an incident angle of 40° satisfy the relationship of $0.92 \leq R_{40}/Re \leq 1.08$.

When the requirements 1 and 2 are satisfied, the resulting optical film may cause reduced color tone changes due to observation angle shift, and may have uniformity in expressing effects, e.g. uniform phase difference compensation, over a wide wavelength range.

As to the requirement 1, it is preferable that $R_{450}/R_{550} \leq 0.95$ is satisfied. In addition, it is preferable that $R_{650}/R_{550} \geq 1.05$ is satisfied.

As to the requirement 2, the incident angle of 0° is a direction normal to the film, and the incident angle of 40° is an angle inclined at 40° with respect to the direction normal to the film. No particular limitation is imposed on the inclination direction of the observation angle when $R_{40}$ is measured. When the value of $R_{40}$ of an optical film with the observation angle inclined in any one direction satisfies the requirement 2, the optical film can be preferably used in the present invention.

The wavelength for comparing Re and $R_{40}$ in the requirement 2 may be any wavelength in the visible range, and may preferably be 550 nm.

The retardations at incident angles of 0° and 40° may be measured by the parallel Nicole rotation method using KOBRA-WR, a product of Oji Scientific Instruments.

The optical film of the present invention that satisfies the requirements 1 and 2 may be obtained by appropriately adjusting types and ratios of the amounts of the resins x1, y1, x2, and y2 and the thicknesses of the layer A and the layer B. More specifically, the adjustment may be performed as follows.

In the present invention, it is preferable that the intrinsic birefringence value of the resin composition P1 is positive and the intrinsic birefringence value of the resin composition P2 is negative, for readily satisfying the requirement 2.

The resin composition P1 having a positive intrinsic birefringence value may be obtained by appropriately adjusting types and ratio of the amounts of the resins x1 and y1. As a preferable example, the resin composition P1 may be obtained as follows. A norbornene resin may be used as the resin x1, and a polystyrene resin may be used as the resin y1. The ratio of the amount of the resin y1 relative to the total amount of the resins x1 and y1 may be set to less than 50 percent by weight.

The resin composition P2 having a negative intrinsic birefringence value may be obtained by appropriately adjusting types and ratio of the amounts of the resins x2 and y2. As a preferable example, the resin composition P2 may be obtained as follows. A polyphenylene ether resin may be used as the resin x2, and a polystyrene resin may be used as the resin y2. The ratio of the amount of the resin x2 relative to the total amount of the resins x2 and y2 may be set to less than 50 percent by weight.

As the norbornene resin, any of known norbornene resins may be used. Specific examples thereof may include those described in Japanese Patent Application Laid-Open Nos. Sho 60-168708, Sho 62-252406, Sho 63-264626, Hei 01-240517, and Hei 02-133413. As the polystyrene-based resin, any known resin containing styrene as a monomer component may be used. More specific examples thereof may include product name "HF77", product of PS Japan Corporation, and product name "Dylark D332", product of NOVA Chemicals. As the polyphenylene ether resin, any known resin having a polyphenylene ether skeleton in its main chain may be used. Particularly preferable is poly(2,6-dimethyl-1,4-phenylene oxide) because of its high compatibility with styrene-based resins.

Satisfying the requirement 2, the optical film of the present invention can have the refractive indices nx and ny in the directions of in-plane principal axes and the refractive index nz in the thickness direction which satisfy the relationship of nx>nz>ny. Examples of the film that satisfies the requirement 2 may include stretched films which will be described later.

The resin compositions P1 and P2 that forms the layer A and the layer B may have heat deflection temperatures (Ts (p1) and Ts(p2)) of preferably 80° C. or higher, more preferably 90° C. or higher, and particularly preferably 100° C. or higher. The heat deflection temperature Ts(p1) of the resin composition P1 forming the layer A and the heat deflection temperature Ts(p2) of the resin composition P2 forming the layer B are usually not more than 170° C. By setting the heat deflection temperatures in the aforementioned ranges, orientational relaxation can be reduced, and the optical film of the present invention can be easily obtained by the stretching manufacture method which will be described later.

The absolute value of the difference between the heat deflection temperatures Ts(p1) and Ts(p2) is preferably 5° C. or more, more preferably 5 to 40° C., and particularly preferably 8 to 30° C. If the difference between the heat deflection temperatures is too small, the temperature dependence of the phase difference-causing ability may become small. If the difference between the heat deflection temperatures is too large, it is difficult to stretch a resin composition having a higher heat deflection temperature, and the flatness of the phase difference plate is likely to reduce.

The rupture elongation of the resin composition P1 at temperature Ts(p1) and the rupture elongation of the resin composition P2 at temperature Ts(p2) are preferably 50% or more and particularly preferably 80% or more. With the thermoplastic resin compositions having rupture elongations in the aforementioned range, it is possible to stably manufacture the phase difference film by stretching. The rupture elongation is determined at a tensile rate of 100 mm/min using a type 1B specimen described in JISK7127.

If necessary, the resin composition P1 and/or the resin composition P2 may contain additives.

No particular limitation is imposed on the additives to be added. Examples of the additives may include: anti-friction agent; lamellar crystal compounds; inorganic fine particles; stabilizers such as anti-oxidants, thermal stabilizers, photostabilizers, weathering stabilizers, ultraviolet absorbers, and near-infrared absorbers; plasticizers; coloring agents such as dyes and pigments; and antistatic agents. The amounts of the additives may be appropriately determined within a range that does not impair the object of the present invention. Anti-friction agents and ultraviolet absorbers are particularly preferably added because the flexibility and the weather resistance can thereby be improved.

The amount of the additives may be determined such that for example, the obtained optical film can maintain a total light transmittance of 85% or more.

Examples of the anti-friction agent may include: inorganic particles of, e.g., silicon dioxide, titanium dioxide, magnesium oxide, calcium carbonate, magnesium carbonate, barium sulfate, and strontium sulfate; and organic particles of, e.g., polymethyl acrylate, polymethyl methacrylate, polyacrylonitrile, polystyrene, cellulose acetate, and cellulose acetate propionate. In the present invention, organic particles are preferred as the anti-friction agent.

Examples of the ultraviolet absorber may include oxybenzophenone-based compounds, benzotriazole-based compounds, salicylate-based compounds, benzophenone-based-ultraviolet absorbers, benzotriazole-based ultraviolet absorbers, acrylonitrile-based ultraviolet absorbers, triazine-based compounds, nickel complex salt-based compounds, and inorganic powders. Preferred examples of the ultraviolet absorber may include 2,2'-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2,4-di-tert-butyl-6-(5-chlorobenzotriazole-2-yl)phenol, 2,2'-dihydroxy-4,4'-dimethoxybenzophenone, and 2,2',4,4'-tetrahydroxybenzophenone. Particularly preferred examples may be 2,2'-methylenebis(4-(1,1,3,3-tetramethylbutyl)-6-(2H-benzotriazole-2-yl)phenol).

The optical film of the present invention may have one layer A and one layer B or may have a plurality of layers A and/or a plurality of layers B. When the optical film has a plurality of layers A and/or a plurality of layers B, no particular limitation is imposed on the order of stacking. For example, the layer structure may be (layer A)-(layer A)-(layer B)-(layer B) or may be (layer A)-(layer B)-(layer A)-(layer B). In the present invention, it is preferable to form a film having the layers A and B that are disposed in direct contact with each other, in terms of achieving optical functions and of easy manufacturing. Such a film may be manufactured by a method such as co-extrusion-stretching which will be described later. However, the manufacture method is not limited thereto, and the layer A and the layer B may be stacked via a layer interposed therebetween such as an adhesive layer.

The ratio of the total thickness of the layer A relative to the total thickness of the layer B may be determined depending on each layer's phase difference-causing ability in response to stretching. By increasing the thickness of the layer having lower phase difference-causing ability, the retardation can be adjusted so as to suffice $0.92 \leq R_{40}/Re \leq 1.08$. When a plurality of layers A and a plurality of layers B are used, the total thickness of the layers A and the total thickness of the layers B mean the total thickness of the layers A and of the layers B, respectively. The thickness of the optical film of the present invention is preferably 30 to 200 μm as the total thickness of the layer A and the layer B altogether. For example, the thickness may be 50 to 150 μm or 100 to 150 μm.

The thicknesses of the layer A and the layer B may be determined by measurement of the total thickness of the film using a commercially available contact type thickness meter, and subsequent observation under an optical microscope of the cross-section of the position at which the total thickness has been measured. By the observation, the thickness ratio of each layers may be determined, and each thickness may be calculated from the determined ratio. This procedure may be repeated at a plurality of positions on the film at constant intervals, and the average values and variations of the thickness may thereby be determined.

The optical film of the present invention may have layers other than the layer A and the layer B. For example, the optical film may have: a bonding layer for bonding the layer A to the layer B; a mat layer for improving the anti-friction properties of the film; a hard coating layer such as a shock resistant polymethacrylate resin layer; an anti-reflection layer; an anti-fouling layer; and other layers.

The total light transmittance suitable for the optical film of the present invention is preferably 85% or more. The total light transmittance is a value measured using a spectrophotometer (ultraviolet-visible-near-infrared spectrophotometer "V 570," product of JASCO Corporation) in accordance with JIS K0115.

The haze of the optical film of the present invention is preferably 5% or less, more preferably 3% or less, and particularly preferably 1% or less. When the value of the haze is small, the sharpness of a display image on a display device in which the optical film of the present invention is installed can be increased. The haze is determined as the average of measurements at five points using a "turbidimeter NDH-300A (product of Nippon Denshoku Industries Co., Ltd.)" in accordance with JIS K7361-1997.

The optical film of the present invention has a $\Delta YI$ of preferably 5 or less and more preferably 3 or less. When the $\Delta YI$ is within the aforementioned ranges, the film is colorless and has good visibility. The $\Delta YI$ is determined by repeating measurement five times using a "spectral color-difference meter SE2000 (product of Nippon Denshoku Industries Co., Ltd.)" in accordance with ASTM E313 and calculating the arithmetic average of the measurements.

Preferably, the optical film of the present invention has a JIS pencil hardness of H or more. The JIS pencil hardness can be adjusted by changing the type of the resins and changing the thickness of the resin layers. The JIS pencil hardness is determined by scratching the surface of a film with pencils in accordance with JIS K5600-5-4. Scratching is performed with pencils with a variety of hardness which are inclined at the angle of 45° to which 500 gram-force of downward load is applied. The hardness is determined as the softest pencil that creates scratches.

It is preferable that the optical film of the present invention is a lengthy film from the viewpoint of manufacturing efficiency.

The lengthy film is a film having a lengthwise size larger (for example, 10 or more times larger) than its crosswise size. Such a film may be obtained by a continuous manufacturing process performed in the lengthwise direction in a manufacturing line. Particularly, when a pre-stretch film which will be described later is prepared in a form of a lengthy film and this is then stretched for preparing the optical film of the present invention, a part of or the entire procedure may be performed in line in a simple and efficient manner.

Specifically, an optical film having the desired refractive indices ($nx>nz>ny$), which have not been easily obtainable in the prior art manufacture process, can be easily obtained by simple operation, i.e., biaxially stretching a pre-stretch film having a plurality of layers in specific directions. Such an operation does not require a complicated process such as lamination of resin films that have been stretched at different stretching ratios in different stretching directions or shrinkage of a stretched resin.

(Stretched Optical Film)

The optical film of the present invention may be a stretched film. That is, the optical film may be a film obtained by subjecting a pre-stretch film to stretching. As the pre-stretch film, a film having a layer PA formed of the resin composition P1 and a layer PB formed of the resin composition P2 may be used. The pre-stretch film may usually be an isotropic raw material film. However, a film that has already been subjected to stretching may also be used as the pre-stretch film, and such a film may be further subjected to stretching defined in the present invention as the stretching of the pre-stretch film.

(Pre-stretch Film)

It is preferable that the pre-stretch film satisfies the following requirement 3 for obtaining a desired phase difference for a phase difference film, and for reducing the color tone changes due to observation angle shift.

(Requirement 3) The pre-stretch film causes a phase delay when the pre-stretch film is uniaxially stretched in a direction of an X axis at temperature T1, and also causes a phase advancement when the pre-stretch film is uniaxially stretched in the direction of the X axis at temperature T2 that is different from the temperature T1, wherein the phase delay and the phase advancement are of a phase of linearly polarized light incident perpendicularly on a surface of the pre-stretch film having a vibration plane of an electric vector lying in an XZ plane (this polarized light will be simply referred to hereinbelow as "XZ polarized light") relative to a phase of linearly polarized light incident perpendicularly on the surface of the pre-stretch film having a vibration plane of an electric vector lying in a YZ plane (this polarized light will be simply referred to hereinbelow as "YZ polarized light"), where the X axis extends in one in-plane direction in the pre-stretch film, the Y axis extends in an in-plane direction orthogonal to the X axis in the pre-stretch film, and the Z axis extends in a direction of a thickness of the pre-stretch film.

In the present invention, when this requirement is satisfied with at least one of the various in-plane directions in the pre-stretch film being set to the X axis, this pre-stretch film may be used as the pre-stretch film that satisfies the requirement 3 for manufacturing the optical film, with that direction being set to the direction of stretching. When the pre-stretch film is an isotropic raw material film that has not been subjected to any orientation treatment before stretching, satisfaction of the requirement with one in-plane direction being set to the X axis results in satisfaction of the requirement with any direction being set to the X axis.

Referring to FIGS. 1 to 4, an example of the pre-stretch film that satisfies the requirement 3 and an example of the pre-stretch film that does not satisfy the requirement 3 will be described.

Figure 1:
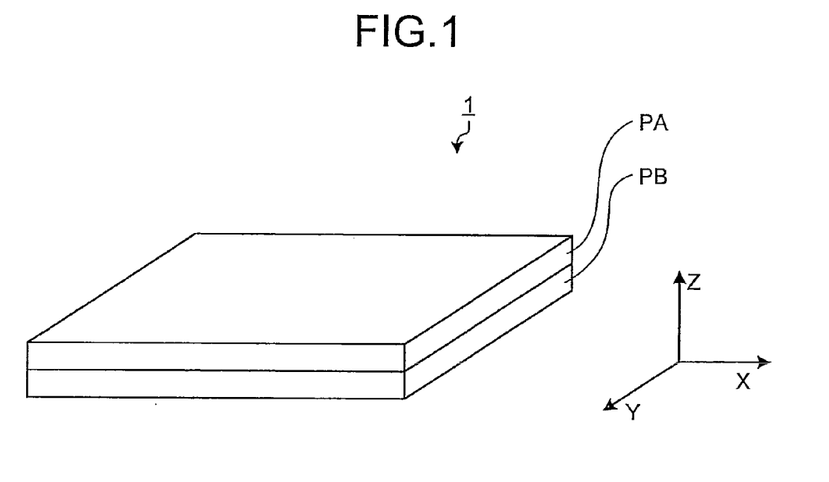
FIG. 1 is a perspective view schematically illustrating an example of a pre-stretch film that does not satisfy the preferred requirements of the present invention.
Figure 2:
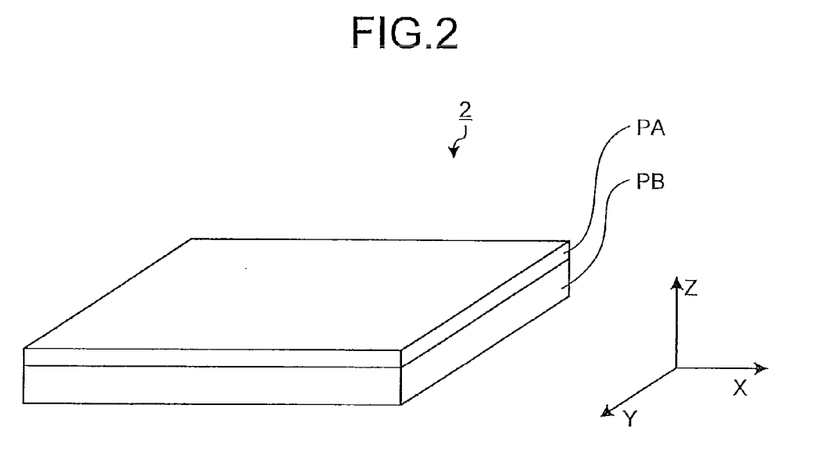
FIG. 2 is a perspective view schematically illustrating an example of a pre-stretch film for use as the material for an optical film of the present invention that satisfies the preferred requirements of the present invention.

Each of pre-stretch films 1 and 2 shown in FIGS. 1 and 2 has a layer PA formed of the resin composition P1 having a positive intrinsic birefringence value and a layer PB formed of the resin composition P2 having a negative intrinsic birefringence value.

Figure 3:
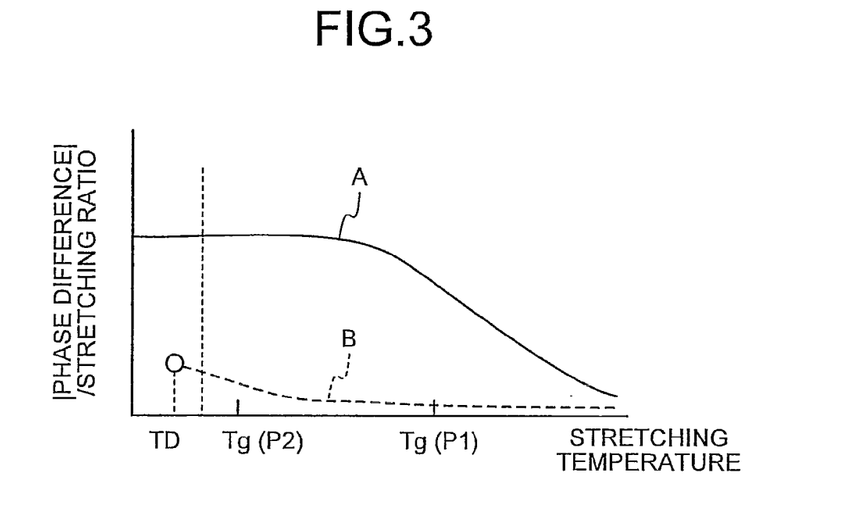
FIG. 3 is a graph showing the relationship between stretching temperature and the development of phase difference when the pre-stretch film shown in FIG. 1 is stretched.
Figure 4:
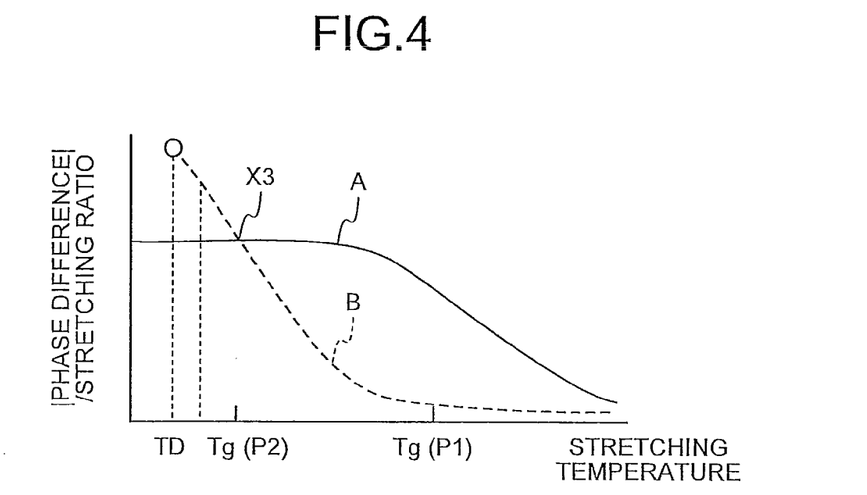
FIG. 4 is a graph showing the relationship between stretching temperature and the development of phase difference when the pre-stretch film shown in FIG. 2 is stretched.

FIGS. 3 and 4 are graphs showing the phase difference (the phase difference of the XZ polarized light relative to the YZ polarized light) in the layer A obtained by stretching the layer PA and the phase difference in the layer B obtained by stretching the layer PB when the pre-stretch films 1 and 2 are stretched in the X axis direction at a variety of temperatures. In each of FIGS. 3 and 4, the horizontal axis represents stretching temperature, and the vertical axis represents the value of (the absolute value of the phase difference/stretching ratio) for the layer A and the layer B. Each of curves A and B represents the relationship therebetween for the layer A and the layer B. The pre-stretch films 1 and 2 are stacked bodies of the layer PA and the layer PB, and therefore, the layer A and the layer B are always stretched at the same ratio.

Since the intrinsic birefringence value of the resin composition P1 is positive and the intrinsic birefringence value of the resin composition P2 is negative, the positivity/negativity of the phase differences of these are opposite. When the curve A lies above the curve B, the XZ polarized light is delayed relative to the YZ polarized light. When the curve B lies above the curve A, the YZ polarized light is delayed relative to the XZ polarized light.

Generally, a resin having a negative intrinsic birefringence value is easily ruptured during stretching at low temperature. In the examples shown in FIGS. 3 and 4, temperature TD is a temperature at which the films do not have tendency to be stretched and ruptures immediately (the rupture point of the resin composition P2), and the pre-stretch films 1 and 2 cannot be stretched at temperature lower than the temperature TD. Tg(P1) and Tg(P2) are glass transition temperatures of the resins P1 and P2, respectively. Thus the curves A and B largely decay at around Tg(P1) and Tg(P2), respectively.

Comparing the pre-stretch films 1 and 2, the thickness of the layer PA is relatively large in the pre-stretch film 1 and the thickness of the layer PA is relatively small in the pre-stretch film 2. Therefore, the change in phase difference of the layer A emerges more strongly in the pre-stretch film 1 than in the pre-stretch film 2. Therefore, as shown in FIG. 3, the absolute value of the phase difference in the layer A is larger in the entirety of the shown temperature range. More specifically, the XZ polarized light is delayed relative to the YZ polarized light by stretching at any temperature. Therefore, the pre-stretch film 1 cannot have the temperature T2 in the requirement 3 and does not satisfy the requirement 3.

In the pre-stretch film 2, the XZ polarized light is advanced relative to the YZ polarized light in the temperature range lower than point X3, and the XZ polarized light is delayed relative to the YZ polarized light in the higher temperature range. Therefore, T1 exists at a temperature higher than the point X3, whereas T2 exists at a temperature lower than X3, so that the requirement 3 is satisfied.

The thicknesses of the layer PA and the layer PB of the pre-stretch film may be appropriately adjusted depending on the stretching ratio and the thickness of the layer A and the layer B of the desired optical film. The ratio between the layer PA and the layer PB may be appropriately adjusted so as to satisfy the requirement 3, as described above. More specifically, the (total thickness of the layer PA)/(the total thickness of the layer PB) may be 1/1 to 1/10. When a plurality of layers PA and a plurality of layers PB are used, the total thickness of the layer PA and the total thickness of the layer PB mean the total thickness of layers PA and of layers PB, respectively.

The total thickness of the pre-stretch film is preferably 10 to 800 μm and more preferably 50 to 600 μm. When the total thickness is not less than 10 μm, a sufficient phase difference and a sufficient mechanical strength can be obtained. When the total thickness is not more than 800 μm, good flexibility and handling properties can be obtained.

(Method for Preparing Pre-stretch Film)

Examples of the method for preparing the pre-stretch film in the present invention may include various known methods such as: co-extrusion methods such as a co-extrusion T-die method, a co-extrusion inflation method, and a co-extrusion lamination method; a co-flow casting method in which the materials for the resin layers are successively flow-casted and stacked; a film lamination forming method such as dry lamination; and a coating forming method in which the surface of a resin film is coated with a resin solution. For example, co-extrusion methods may be used from the viewpoint of manufacturing efficiency and of preventing volatile components such as a solvent from remaining in the film. Among the co-extrusion methods, co-extrusion T-die methods are preferred. The co-extrusion T-die methods may be a field block method or a multi-manifold method. The multi-manifold method is particularly preferred because unevenness of the thickness of the layer PA can be reduced.

When a co-extrusion T-die method is used as the method for obtaining a multilayer film from resin materials, the temperature for melting the resin materials in an extruder having a T-die is preferably higher than the glass transition temperatures (Tg) of the resin materials by 80 to 180° C., and more preferably higher by 100 to 150° C. If the temperature for melting in the extruder is excessively low, the flowability of the resin materials may be insufficient. If the temperature for melting is excessively high, the resins may deteriorate.

The extrusion temperature may be appropriately selected depending on the resins for use. As to the temperatures in the extruder, it is preferable that the temperature of the resin feeding ports is Tg to (Tg+100)° C.; the temperature of the outlets of the extruder is (Tg+50)° C. to (Tg+170)° C.; and the temperature of the die is (Tg+50)° C. to (Tg+170)° C. The Tg is the glass transition temperature of a resin having the highest glass transition temperature among the resins constituting the pre-stretch film.

(Stretching Method)

When the optical film of the present invention is a film formed by stretching a pre-stretch film that satisfies the requirement 3, the stretching of the pre-stretch film preferably includes: stretching treatment (1) in which the pre-stretch film is uniaxially stretched in one direction at one of the temperatures T1 and T2; and stretching treatment (2) in which the resultant film that has been subjected to the stretching treatment (1) is uniaxially stretched in a direction orthogonal to the stretching direction in the stretching treatment (1) at the other one of the temperatures T1 and T2. Such stretching may give a film in which the principal in-plane refractive indices (i.e., the refractive indices along in-plane slow and fast axes) nx and ny and the refractive index nz in the thickness direction satisfy the relationship of nx>nz>ny.

When the heat deflection temperature Ts(p1) of the resin composition P1 is higher than the heat deflection temperature Ts(p2) of the resin composition P2 (Ts(p1)>Ts(p2)), the temperature T1 is preferably Ts(p2)+5° C. or higher and Ts(p1)+10° C. or lower, and more preferably Ts(p2)+5° C. or higher and Ts(p1)+7° C. or lower. The temperature T2 is Ts(p2)+5° C. or lower. In this case, the stretching treatment (1) is performed preferably at the temperature T1. With these stretching temperatures, the refractive indices of the layer A and the layer B can be easily adjusted to desired values.

When the heat deflection temperature Ts(p1) of the resin composition P1 is lower than the heat deflection temperature Ts(p2) of the resin composition P2 (Ts(p1)<Ts(p2)), the temperature T2 is preferably Ts(p2)+5° C. or higher and Ts(p1)+10° C. or lower, and more preferably Ts(p2)+5° C. or higher and Ts(p1)+7° C. or lower. The temperature T1 is Ts(p2)+5°

C. or lower. In this case, the stretching treatment (1) is performed preferably at the temperature T2. With these stretching temperatures, the refractive indices of the layer A and the layer B can be easily adjusted to desired values.

An explanation on such a stretching will be given hereinbelow referring to a case in which the pre-stretch film 2 shown in FIGS. 2 and 4 is stretched in the X axis direction and then stretched in the Y axis direction. Firstly, the pre-stretch film 2 is stretched in the X axis direction at a temperature higher than the point X3 in FIG. 4 (the XZ polarized light is delayed relative to the YZ polarized light (=T1)), whereby the in-plane refractive indices of the layer PA are altered to satisfy nx>ny=nz (in this formula nx refers to the refractive index in the X axis direction). However, the refractive indices of the layer PB are not altered because the stretching is performed at high temperature.

Subsequently, the resulting film is stretched in the Y axis direction at a temperature lower than the point X3 in FIG. 4 (the XZ polarized light is advanced relative to the YZ polarized light (=T2)). The nx of the obtained layer A is thereby reduced, whereas in the layer PB the ny is reduced so as to give refractive indices nx=ny>nz to the layer B. By appropriately adjusting the stretching ratios in the stretching processes and the thickness of each layer, the optical film of the present invention in which the overall refractive indices of the layer A and the layer B satisfy the desired relationship of nx>nz>ny can be obtained.

The stretching operation in the stretching treatment (1) and in the stretching treatment (2) may be performed using a known method. Examples of such a method may include: a method in which a film is uniaxially stretched in a longitudinal direction by utilizing the difference in peripheral speed between rolls; and a method in which a film is uniaxially stretched in a transverse direction using a tenter. Examples of the longitudinal uniaxial stretching method may include an IR heating method performed between rollers, and a float method.

After the stretching treatment (1) and/or the stretching treatment (2), the stretched film may be subjected to fixing treatment. The temperature in the fixing treatment is normally room temperature to the stretching temperature+30° C. and preferably the stretching temperature−40° C. to the stretching temperature+20° C.

(Applications of Optical Film)

The optical film of the present invention is applicable to liquid crystal display devices, organic electroluminescent display devices, plasma display devices, FED (field emission display) devices, SED (surface field emission display) devices, and other use. Preferably, the optical film may be used in a liquid crystal display device of the present invention which will be described below.

(Liquid Crystal Display Device)

The liquid crystal display device of the present invention has the optical film of the present invention.

The liquid crystal display device of the present invention may have a liquid crystal panel in which a light incident-side polarizing plate, a liquid crystal cell, and a light emission-side polarizing plate are disposed in this order.

The visibility of the liquid crystal display device can be significantly improved by disposing the optical film of the present invention as a phase difference plate between the liquid crystal cell and the light incident-side polarizing plate and/or between the liquid crystal cell and the light emission-side polarizing plate. Examples of the driving mode of the liquid crystal cell may include an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super twisted nematic (STN) mode, and an optical compensated bend (OCB) mode.

In the liquid crystal display device of the present invention, the optical film of the present invention used as the phase difference plate may be laminated onto the liquid crystal cell or a polarizing plate. The optical film of the present invention may be laminated onto both sides of a polarizing plate or onto only one side. Two or more optical films of the present invention may be used. Any known adhesive may be used for lamination. Each polarizing plate may include a polarizer and protection films attached to both sides thereof. Instead of the protection films, the optical films of the present invention may be laminated directly onto the polarizer and used as layers having both the function of a phase difference plate and the function of a protection film. With this configuration, the protection films can be omitted, and this can contribute to a reduction in thickness, weight, and cost of the liquid crystal display device.

EXAMPLES

The present invention will be described in detail hereinbelow with reference to Examples and Comparative Examples. However, the present invention is not limited to the Examples.

In the Examples and Comparative Examples, properties were measured as follows.

($R_{450}$, $R_{550}$, $R_{650}$, and $R_{40}$)

$R_{450}$, $R_{550}$, $R_{650}$, and $R_{40}$ (unit: nm) were determined by the parallel Nicole Rotation Method Using Kobra-Wr (Product of Oji Scientific Instruments). The phase differences observed at an incident angle of 0° (in the direction normal to the film) at wavelengths of 450 nm, 550 nm, and 650 nm were taken as $R_{450}$, $R_{550}$, and $R_{650}$. The phase difference observed at an incident angle of 40° (in a direction inclined 40° with respect to the direction normal to the film about a slow axis as a rotation axis) at a wavelength of 550 nm was used as $R_{40}$.

Preparative Example 1

A glass reaction vessel equipped with an agitator was charged with 87 parts of tetrahydrofuran, 17.0 parts of 5-endo-6-exo-dicarboxy-2-norbornene, 15.0 parts of tetracyclo[4.4.0.1$^{2,5}$.1$^{7,10}$]-3-dodecene, and 0.16 parts of 1-hexene (charged ratio of 5-endo-6-exo-dicarboxy-2-norbornene/tetracyclo[4.4.0.1$^{2,5}$.1$^{7,10}$]-3-dodecene=50/50(mole/mole)). Subsequently, 0.016 parts of (1,3-dimesitylimidazolidine-2-ylidene)(tricyclohexylphosphine)benzylidene ruthenium dichloride dissolved in 13 parts of tetrahydrofuran was added, and polymerization was performed at 70° C. Two hours later, the polymerization reaction mixture was poured into a large amount of a poor solvent to precipitate a solid, and the solid was separated by filtration, washed, dried under reduced pressure at 60° C. for 18 hour to obtain a ring-opening metathesis polymerization product.

1 part of the obtained polymerization product was dissolved in 80 parts of tetrahydrofuran, and the mixture was charged into an autoclave equipped with an agitator. Then a hydrogenation catalyst solution prepared by dissolving, in 10 parts of tetrahydrofuran, 0.05 parts of bis(tricyclohexylphosphine)benzylidene ruthenium dichloride and 0.4 parts of ethyl vinyl ether was added, and a hydrogenation reaction was performed at a hydrogen pressure of 1 MPa and 100° C. for 6 hours. After completion of the reaction, the reaction mixture was poured into a large amount of n-hexane to completely precipitate the polymer. The polymer was separated by filtration, washed, and dried under reduced pressure at 90° C. for 18 hours to obtain hydrogenated polynorbornene. The molecular weight (in terms of polystyrene) of the obtained hydrogenated polynorbornene was as follows: the number average molecular weight (Mn) 17,800 and the weight average molecular weight (Mw) 39,200.

Example 1

75 parts by weight of the hydrogenated polynorbornene obtained in Preparative Example 1 and 25 parts by weight of polystyrene (product name "HF77," product of PS Japan Corporation) were dissolved in chloroform to produce a dope solution P1. The concentration of the solids in the dope solution P1 (the ratio of the total amount of the resins relative to the total amount of the solution) was adjusted to 20 percent by weight.

75 Parts by weight of polystyrene (product name "HF77," product of PS Japan Corporation) and 25 parts by weight of poly(2,6-dimethyl-1,4-phenylene oxide) (catalog No 18242-7, ALDRICH) were dissolved in chloroform to produce a dope solution P2. The concentration of the solids in the dope solution P2 was adjusted to 20 percent by weight.

The dope solution P1 was flow-casted on a glass plate using a doctor blade and dried to form a transparent resin layer A1 having a thickness of 200 μm. Then the dope solution P2 was flow-casted on the transparent resin layer A1 using a doctor blade and dried to form a transparent resin layer B1 having a thickness of 300 μm. The transparent resin layer A1 together with the transparent resin layer B1 was peeled off the glass plate to produce a stacked film 1 having the transparent resin layers A1 and B1.

Apart from the stacked film 1, other samples were prepared by flow-casting only the dope solution P1 or P2 and drying the dope solution in the manner described above, and measurement was performed on these samples. As to the resin forming the resin layer A1, the intrinsic birefringence value was positive, the heat deflection temperature Ts(p1) was 125° C., and the glass transition temperature Tg(p1) was 127° C. As to the resin forming the resin layer B1, the intrinsic birefringence value was negative, the heat deflection temperature Ts(p2) was 102° C., and the glass transition temperature Tg(p2) was 110° C.

One in-plane direction in the stacked film 1 was defined as the X axis. The stacked film 1 was stretched by a factor of 3.2 in this direction at 130° C. and then stretched by a factor of 1.25 in the Y axis direction that was orthogonal to the X axis direction at 105° C. to obtain a phase difference film 1 having a thickness of 130 μm.

$R_{450}$, $R_{550}$, $R_{650}$, and $R_{40}$ of the phase difference film 1 were measured. The results are shown in Table 1. As is clear from the results in Table 1, the phase difference film 1 satisfies the requirement $R_{450}<R_{550}<R_{650}$ and also satisfies the requirement $0.92 \leq R_{40}/R_{550} \leq 1.08$.

When the phase difference film 1 is stretched in the X axis direction at a stretching temperature of 130° C., the phase of the XZ polarized light is delayed relative to the phase of the YZ polarized light. When the phase difference film 1 is stretched in the X axis direction at a stretching temperature of 105° C., the phase of the XZ polarized light is advanced relative to the phase of the YZ polarized light. Therefore, the temperature corresponding to the point X3 in FIG. 4 is present between 105 and 130° C. Accordingly, the phase difference film 1 satisfies the requirement 3.

Example 2

The dope solution P1 was flow-casted on a glass plate using a doctor blade and dried to form a transparent resin layer A4 having a thickness of 230 μm. Then the dope solution P2 was flow-casted on the transparent resin layer A4 using a doctor blade and dried to form a transparent resin layer B4 having a thickness of 270 μm. The transparent resin layer A4 together with the transparent resin layer B4 was peeled off the glass plate to produce a stacked film 4 having the transparent resin layers A4 and B4.

One in-plane direction in the stacked film 4 was defined as the X axis. The stacked film 4 was stretched by a factor of 3.2 in this direction at 130° C. and then stretched by a factor of 1.25 in the Y axis direction that was orthogonal to the X axis direction at 105° C. to obtain a phase difference film 4 having a thickness of 130 μm.

$R_{450}$, $R_{550}$, $R_{650}$, and $R_{40}$ of the phase difference film 4 were measured. The results are shown in Table 1. As is clear from the results in Table 1, the phase difference film 4 satisfies the requirement $R_{450}<R_{550}<R_{650}$ and also satisfies the requirement $0.92 \leq R_{40}/R_{550} \leq 1.08$.

When the phase difference film 4 is stretched in the X axis direction at a stretching temperature of 130° C., the phase of the XZ polarized light is delayed relative to the phase of the YZ polarized light. When the phase difference film 4 is stretched in the X axis direction at a stretching temperature of 105° C., the phase of the XZ polarized light is advanced relative to the phase of the YZ polarized light. Therefore, the temperature corresponding to the point X3 in FIG. 4 is present between 105 and 130° C. Accordingly, the phase difference film 4 satisfies the requirement 3.

Example 3

78 Parts by weight of the hydrogenated polynorbornene obtained in Preparative Example 1 and 22 parts by weight of polystyrene (product name "HF77," product of PS Japan Corporation) were dissolved in chloroform to produce a dope solution P5. The concentration of the solids in the dope solution P5 (the ratio of the total amount of the resins to the total amount of the solution) was adjusted to 20 percent by weight.

78 Parts by weight of polystyrene (product name "HF77," product of PS Japan Corporation) and 22 parts by weight of poly(2,6-dimethyl-1,4-phenylene oxide) (catalog No 18242-7, ALDRICH) were dissolved in chloroform to produce a dope solution P6. The concentration of the solids in the dope solution P6 was adjusted to 20 percent by weight.

The dope solution P5 was flow-casted on a glass plate using a doctor blade and dried to form a transparent resin layer A5 having a thickness of 200 μm. Then the dope solution P6 was flow-casted on the transparent resin layer A5 using a doctor blade and dried to form a transparent resin layer B5 having a thickness of 300 μm. The transparent resin layer A5 together with the transparent resin layer B5 was peeled off the glass plate to produce a stacked film 5 having the transparent resin layers A5 and B5.

Apart from the stacked film 5, other samples were prepared by flow-casting of only the dope solution P5 or P6 and drying the dope solution in the manner described above, and measurement was performed on these samples. As to the resin forming the resin layer A5, the intrinsic birefringence value was positive, the heat deflection temperature Ts(p1) was 128° C., and the glass transition temperature Tg(p1) was 129° C. As to the resin forming the resin layer B6, the intrinsic birefringence value was negative, the heat deflection temperature Ts(p2) was 100° C., and the glass transition temperature Tg(p2) was 107° C.

One in-plane direction in the stacked film 5 was defined as the X axis. The stacked film 5 was stretched by a factor of 3.2 in this direction at 130° C. and then stretched by a factor of 1.25 in the Y axis direction that was orthogonal to the X axis direction at 100° C. to obtain a phase difference film 5 having a thickness of 130 μm.

$R_{450}$, $R_{550}$, $R_{650}$, and $R_{40}$ of the phase difference film 5 were measured. The results are shown in Table 1. As is clear from the results in Table 1, the phase difference film 5 satisfies the requirement $R_{450}<R_{550}<R_{650}$ and also satisfies the requirement $0.92 \leq R_{40}/R_{550} \leq 1.08$.

When the phase difference film 5 is stretched in the X axis direction at a stretching temperature of 130° C., the phase of the XZ polarized light is delayed relative to the phase of the YZ polarized light. When the phase difference film 5 is stretched in the X axis direction at a stretching temperature of 100° C., the phase of the XZ polarized light is advanced relative to the phase of the YZ polarized light. Therefore, the temperature corresponding to the point X3 in FIG. 4 is present between 100 and 130° C. Accordingly, the phase difference film 5 satisfies the requirement 3.

Comparative Example 1

A polycarbonate resin (product name "WONDERLITE PC-101," product of Asahi Kasei Corporation) was dissolved in chloroform to produce a dope solution P3. The concentration of the solid in the dope solution P3 was adjusted to 20 percent by weight.

A styrene-maleic anhydride copolymer resin (product name "Dylark D332," product of NOVA Chemicals) was dissolved in chloroform to produce a dope solution P4. The concentration of the solid in the dope solution P4 was adjusted to 20 percent by weight.

The dope solution P3 was flow-casted on a glass plate using a doctor blade and dried to form a transparent resin layer A2 having a thickness of 20 μm. Then the dope solution P4 was flow-casted on the transparent resin layer A2 using a doctor blade and dried to form a transparent resin layer B2 having a thickness of 160 μm. The transparent resin layer A2 together with the transparent resin layer B2 was peeled off the glass plate to produce a stacked film 2.

Apart from the stacked film 2, other samples were prepared by flow-casting of only the dope solution P3 or P4 and drying the dope solution in the manner described above, and measurement was performed on these samples. As to the resin forming the resin layer A2, the intrinsic birefringence value was positive and the heat deflection temperature Ts(p1) was 145° C. As to the resin forming the resin layer B2, the intrinsic birefringence value was negative, and the heat deflection temperature Ts(p2) was 135° C.

One in-plane direction in the stacked film 2 was defined as the X axis. The stacked film 2 was stretched by a factor of 1.5 in this direction at 145° C. and then stretched by a factor of 1.25 in the Y axis direction that was orthogonal to the X axis direction at 130° C. to obtain a phase difference film 2 having a thickness of 98 μm.

$R_{450}$, $R_{550}$, $R_{650}$, and $R_{40}$ of the phase difference film 2 were measured. The results are shown in Table 1. As is clear from the results in Table 1, the phase difference film 2 does not satisfy the requirement $R_{450}<R_{550}<R_{650}$, although does satisfy the requirement $0.92 \leq R_{40}/R_{550} \leq 1.08$.

Comparative Example 2

The dope solution P1 obtained in Example 1 was flow-casted on a glass substrate and dried to form a transparent resin layer A3 having a thickness of 200 μm. The transparent resin layer A3 was peeled off the glass substrate to produce a single layer film having only the transparent resin layer A3.

One in-plane direction in the single layer film 3 was defined as the X axis. The single layer film 3 was stretched by a factor of 1.25 in this direction at 150° C. to obtain a phase difference film 3 having a thickness of 162 μm.

$R_{450}$, $R_{550}$, $R_{650}$, and $R_{40}$ of the phase difference film 3 were measured. The results are shown in Table 1. As is clear from the results in Table 1, the phase difference film 3 does not satisfy the requirement $0.92 \leq R_{40}/R_{550} \leq 1.08$, although does satisfy the requirement $R_{450}<R_{550}<R_{650}$.

TABLE 1

|  | 1st stretching | 2nd stretching | $R_{450}$ (nm) | $R_{550}$ (nm) | $R_{650}$ (nm) | $R_{40}$ (nm) | $R_{40}/R_{550}$ |
|---|---|---|---|---|---|---|---|
| Ex. 1 | 130° C. factor of 3.2 | 105° C. factor of 1.25 | 168 | 212 | 239 | 210 | 0.991 |
| Ex. 2 | 130° C. factor of 3.2 | 105° C. factor of 1.25 | 184 | 232 | 261 | 243 | 1.047 |
| Ex. 3 | 130° C. factor of 3.2 | 100° C. factor of 1.25 | 590 | 602 | 603 | 589 | 0.978 |
| Comp. Ex. 1 | 145° C. factor of 1.5 | 130° C. factor of 1.25 | 329 | 305 | 296 | 304 | 0.997 |
| Comp. Ex. 2 | 150° C. factor of 1.25 | — | 225 | 285 | 328 | 314 | 1.102 |

| EXPLANATIONS OF REFERENCE NUMERALS | |
|---|---|
| 1, 2 | Pre-stretch film |
| A | Curve representing characteristics of layer A |
| B | Curve representing characteristics of layer B |

The invention claimed is:

1. An optical film, comprising:
   a layer A formed of a resin composition P1 containing a resin x1 having a positive intrinsic birefringence value and a resin y1 having a negative intrinsic birefringence value; and a layer B formed of a resin composition P2 containing a resin x2 having a positive intrinsic birefringence value and a resin y2 having a negative intrinsic birefringence value, wherein:
   retardation $R_{450}$ of light having a wavelength of 450 nm at an incident angle of 0°, retardation $R_{550}$ of light having a wavelength of 550 nm at an incident angle of 0°, and retardation $R_{650}$ of light having a wavelength of 650 nm at an incident angle of 0° satisfy a relationship of $R_{450}<R_{550}<R_{650}$, and
   retardation Re at an incident angle of 0° and retardation $R_{40}$ at an incident angle of 40° satisfy a relationship of $0.92 \leq R_{40}/Re \leq 1.08$.

2. The optical film according to claim 1, wherein:
   an intrinsic birefringence value of the resin composition P1 is positive, and an intrinsic birefringence value of the resin composition P2 is negative.

3. The optical film according to claim 1, wherein:
   the optical film is obtained by stretching more than once a pre-stretch film.

4. The optical film according to claim 3, wherein:
   the pre-stretch film has a layer PA formed of the resin composition P1 and a layer PB formed of the resin composition P2, and
   the pre-stretch film is a film which causes a phase delay when the pre-stretch film is uniaxially stretched in a direction of an X axis at temperature T1 and which also causes a phase advancement when the pre-stretch film is uniaxially stretched in the direction of the X axis at temperature T2 that is different from the temperature T1, said phase delay and said phase advancement being of a phase of linearly polarized light incident perpendicularly on a surface of the pre-stretch film having a vibration plane of an electric vector lying in an XZ plane relative to a phase of linearly polarized light incident perpendicularly on the surface of the pre-stretch film having a vibration plane of an electric vector lying in a YZ plane, where the X axis extends in one in-plane direction in the pre-stretch film, the Y axis extends in an in-plane direction orthogonal to the X axis in the pre-stretch film, and the Z axis extends in a direction of a thickness of the pre-stretch film.

5. The optical film according to claim 4, wherein the stretching comprises:

stretching treatment (1) in which the pre-stretch film is uniaxially stretched in one stretching direction at one of the temperatures T1 and T2; and stretching treatment (2) in which the pre-stretch film that has been subjected to the stretching treatment (1) is uniaxially stretched in a direction orthogonal to the one stretching direction in the stretching treatment (1) at the other of the temperatures T1 and T2.

6. The optical film according to claim 1, wherein a difference between a heat deflection temperature Ts(p1) of the resin composition P1 and a heat deflection temperature Ts(p2) of the resin composition P2 is 5° C. or more.

7. The optical film according to claim 1, wherein optical film is a lengthy film.

8. A liquid crystal display device, comprising the optical film according to claim 1.

* * * * *